US 7,646,386 B2

(12) United States Patent
Schuster et al.

(10) Patent No.: US 7,646,386 B2
(45) Date of Patent: *Jan. 12, 2010

(54) MODIFYING A PATH IN A DRAWING

(75) Inventors: Michael D. Schuster, Woodside, CA (US); Paul J. Asente, La Honda, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/109,495

(22) Filed: Apr. 19, 2005

(65) Prior Publication Data

US 2006/0232603 A1 Oct. 19, 2006

(51) Int. Cl.
  *G06T 11/20* (2006.01)
  *G09G 5/00* (2006.01)
  *G09G 5/02* (2006.01)
  *G06K 9/00* (2006.01)
(52) U.S. Cl. .............. 345/441; 345/442; 345/581; 345/589; 382/165
(58) Field of Classification Search ............ 345/441, 345/442, 581, 589, 428; 382/165
See application file for complete search history.

(56) References Cited

U.S. PATENT DOCUMENTS

| 4,916,624 | A | * | 4/1990 | Collins et al. ............ 700/132 |
| 5,125,074 | A | | 6/1992 | Labeaute et al. |
| 5,137,662 | A | * | 8/1992 | Hull et al. ............... 264/401 |
| 5,278,983 | A | * | 1/1994 | Kawabe et al. ........... 345/420 |
| 5,295,235 | A | | 3/1994 | Newman |
| 5,428,717 | A | | 6/1995 | Glassner |
| 5,553,168 | A | | 9/1996 | Hennessey et al. |
| 5,579,461 | A | * | 11/1996 | Saha ..................... 345/443 |
| 5,831,633 | A | * | 11/1998 | Van Roy ................. 345/441 |
| 5,934,209 | A | * | 8/1999 | Mizuno ................. 112/102.5 |
| 6,049,339 | A | * | 4/2000 | Schiller et al. ........... 345/630 |
| 6,069,633 | A | | 5/2000 | Apparao et al. |
| 6,259,821 | B1 | * | 7/2001 | Branciforte et al. ....... 382/258 |
| 6,310,622 | B1 | | 10/2001 | Asente |
| 6,504,541 | B1 | | 1/2003 | Liu et al. |

(Continued)

FOREIGN PATENT DOCUMENTS

JP 62249281 A 4/1986

(Continued)

OTHER PUBLICATIONS

Adobe, "Adobe Illustrator 10 User Guide", 2001, pp. 254 and 255.*

(Continued)

*Primary Examiner*—Ulka Chauhan
*Assistant Examiner*—Jeffrey J Chow
(74) *Attorney, Agent, or Firm*—Van Pelt, Yi & James, LLP

(57) ABSTRACT

A technique for editing is disclosed. The technique includes generating a path definition for a path, generating a plurality of subpath definitions of subpaths of the path based on an intersection of the path, associating the subpath definitions with the path definition, modifying the intersection of the path using an editing tool, and generating a plurality of modified subpath definitions of subpaths of the path based on the modified intersection of the path.

33 Claims, 13 Drawing Sheets

U.S. PATENT DOCUMENTS

| | | | |
|---|---|---|---|
| 6,515,675 B1* | 2/2003 | Bourdev | 345/629 |
| 6,522,328 B1* | 2/2003 | Asente | 345/441 |
| 6,556,212 B1* | 4/2003 | Griffin | 345/593 |
| 6,720,977 B1* | 4/2004 | Bourdev et al. | 345/629 |
| 6,727,906 B2* | 4/2004 | Lockeridge et al. | 345/581 |
| 6,734,987 B1 | 5/2004 | Cauligi | |
| 6,768,488 B1* | 7/2004 | Kotani et al. | 345/441 |
| 6,894,704 B1* | 5/2005 | Bourdev et al. | 345/629 |
| 6,982,723 B1* | 1/2006 | Szymaniak | 345/611 |
| 7,084,882 B1 | 8/2006 | Dorum et al. | |
| 2002/0030677 A1 | 3/2002 | Huang et al. | |
| 2002/0145616 A1 | 10/2002 | Doan | |
| 2002/0167513 A1 | 11/2002 | Baraff et al. | |
| 2003/0122830 A1* | 7/2003 | Yap | 345/441 |
| 2004/0119724 A1 | 6/2004 | Hawksworth | |
| 2004/0183800 A1 | 9/2004 | Peterson | |
| 2005/0007381 A1* | 1/2005 | Chen | 345/613 |
| 2005/0071042 A1 | 3/2005 | Subrahmanyam et al. | |
| 2005/0156930 A1 | 7/2005 | Nishioka et al. | |
| 2005/0179694 A1 | 8/2005 | Liu et al. | |
| 2005/0246145 A1* | 11/2005 | Zhu | 703/2 |
| 2005/0253844 A1* | 11/2005 | Hoppe et al. | 345/428 |
| 2006/0077210 A1* | 4/2006 | Morris et al. | 345/613 |
| 2006/0082597 A1* | 4/2006 | McDaniel et al. | 345/648 |
| 2007/0206007 A1 | 9/2007 | Taubin | |

FOREIGN PATENT DOCUMENTS

| | | | |
|---|---|---|---|
| JP | 02257368 A | 3/1989 | |

OTHER PUBLICATIONS

Macromedia, Macromedia-Flash MX 2004, Accessibility Macromedia, 1995-2004, http://web.archive.org/web/20041103072103/http://www.macromedia.com/software/flash.

Macromedia, The History of Flash, 1995-2005, http://www.macromedia.com/macromedia/events/john_gay/.

Guha et al., Rock: A Robust Clustering Algorithm for Categorical Attributes, IEEE Conference on Data Engineering, 1999.

Gangnet et al., SIGGRAPH'94 Technical Sketch Submission, Automatic Gap Closing for Freehand Drawing, http://www.lri.fr/~fekete/ps/siggraph94.pdf.

Flashmagizine.com, The Flash History, How it all began, Jul. 31, 2002.

Baudelaire et al., Planar Maps: An Interaction Paradigm for Graphic Design, CHI'89 Proceedings.

Gangnet et al., Incremental Computation of Planar Maps, Computer Graphics, vol. 23, No. 3, Jul. 1989.

Jonathan Richard Shewchuk, Robust Adaptive Floating-Point Geometric Predicates, May 1996.

Victor J. Milenkovic, Shortest Path Geometric Rounding, , Jul. 27, 2000.

John D. Hobby, Practical Segment Intersection with Finite Precision Output, Computational Geometry, Apr. 15, 1996.

Bentley et al., Algorithms for Reporting and Counting Geometric Intersections, IEEE Transactions on Computers, vol. C-28, No. 9, Sep. 1979.

"PostScript Language Reference Manual Second Edition", Addison-Wesley Publishing Co., 1990, pp. 157-166.

Bentley et al., "Algorithms for Reporting and Counting Geometric Intersections", IEEE Transactions on Computer, vol. C-28, No. 9, Sep. 1979, pp. 693-647.

* cited by examiner

MODIFYING A PATH IN A DRAWING

BACKGROUND OF THE INVENTION

Drawings are used to express ideas visually on the web, in print or in other media. Drawings can be created and edited in software using various drawing applications. A typical drawing includes a plurality of paths that form regions, each of which could be filled with a color. FIG. 1 illustrates a drawing before and after an edit. Five paths 106, 108, 110, 112, and 114 and four regions 120, 122, 124, and 126 are shown. Paths 106 and 108 intersect each other at points (a,b) and (c,d). Paths 106 and 108 are intersected by paths 110, 112, and 114 to form regions 120, 122, 124, and 126. Each region is filled with a color. For example, a paint bucket tool can be used to fill each region. In this example, region 120 is red, region 122 is yellow, region 124 is blue, and region 126 is green. A user may wish to make path 108 wider. The user might try clicking on path 108 with a mouse and dragging to the right, as shown by the dashed arrow. However, as shown, only a segment of path 108 is stretched, rather than the entire path. The problem is drawing applications typically segment a path at crossings, making it difficult to edit an original defining path. An improved editing method is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
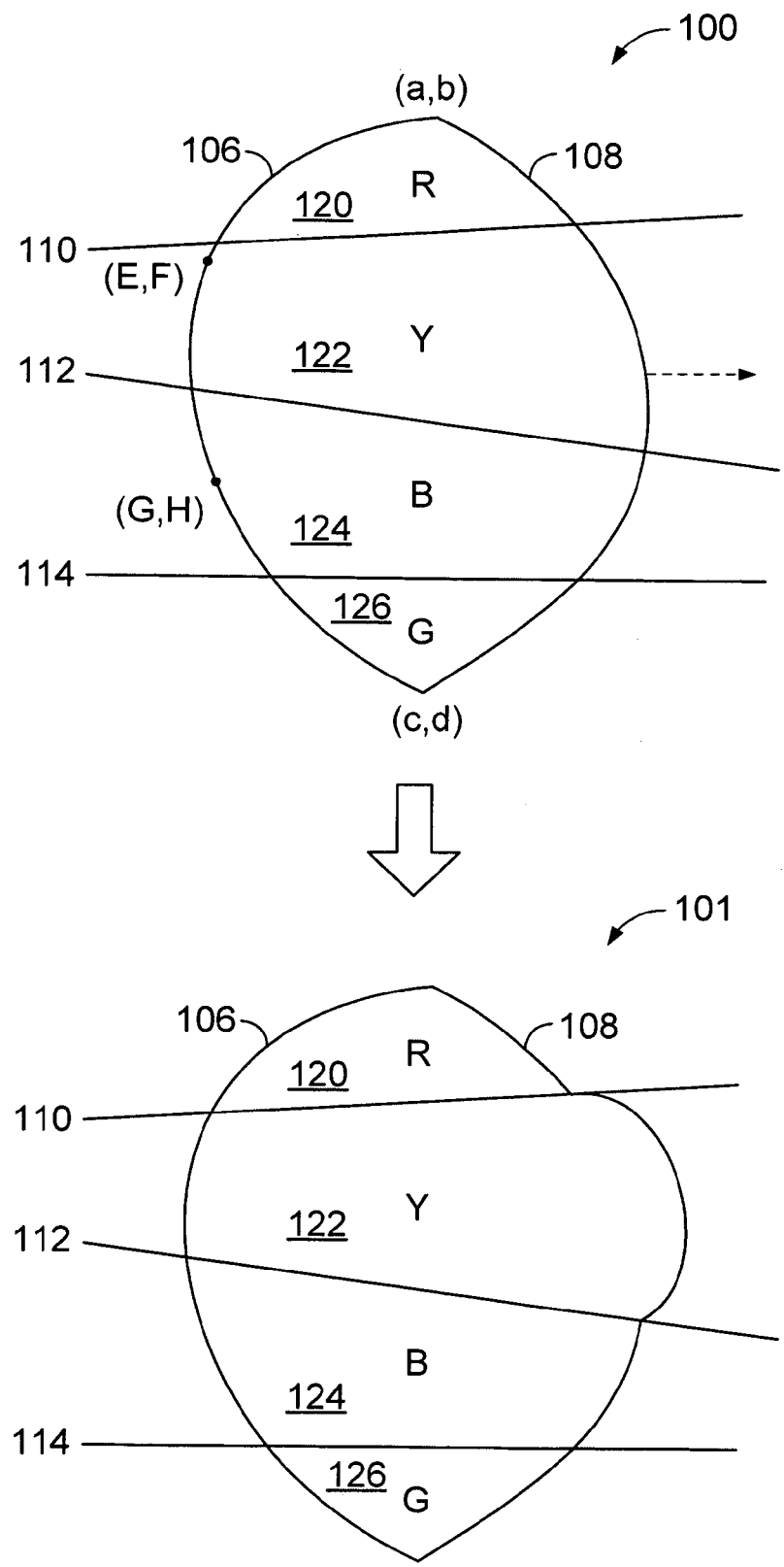
FIG. 1 illustrates a drawing before and after an edit.
Figure 2A:
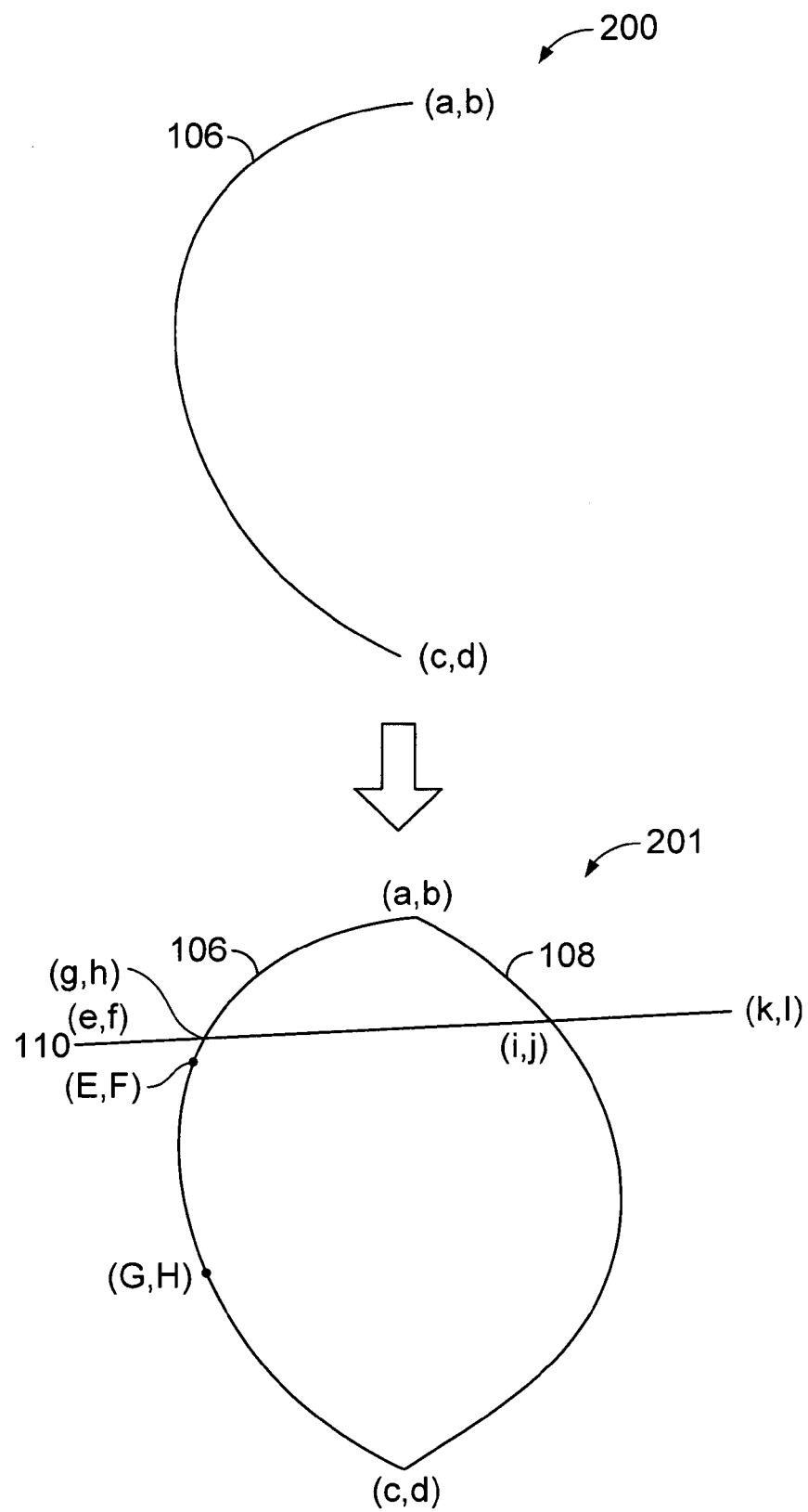
FIG. 2A illustrates a drawing before and after an edit.

FIG. 2A illustrates a drawing before and after an edit. In this example, drawing 200 is shown before and after path 108 and path 110 are inserted. Initially, path 106 with endpoints (a,b) and (c,d) is shown. A path definition of path 106 is stored, for example, in a structure or object. In some embodiments, the path definition is stored in an artwork representation that may be used for display or printing. The artwork representation could include a unique identifier, a path description, and a sequence of color transitions. The path description refers to the geometric shape of the path. The path description could include, for example, a sequence of cubic Bezier curve control points or path coordinates. The sequence of color transitions includes region colors associated with each side of the path. Color, as used herein, refers to any attribute of a region, path, or subpath. In any of these examples, other attributes can be used, including, but not limited to, filling with color, absence of color, a pattern (e.g., hatching), a texture, a gradient, a portion of an image, or an abstract attribute, such as an identifier. A region, as used herein, can be bounded (finite area) or unbounded (infinite area). For example, a bounded region could be bounded by subpath(s) and/or path(s). The following is an example of an artwork representation of drawing 100:

path 106

(a,b)->(E,F)->(G,H)->(c,d)

(a,b)->(c,d) none none black 1

In this example, "(a,b)->(E,F)->(G,H)->(c,d)" is a description of the geometric shape of path 106. In this case, the points (a,b), (E,F), (G,H), and (c,d) are the sequence of cubic Bezier curve control points of path 106. "(a,b)->(c,d)" indicates that a subpath is defined on path 106 between (a,b) and (c,d). A subpath, or edge, is a portion of a path between an intersection or endpoint and another intersection or endpoint of the path. "none none" indicates that the regions on either side of the subpath have no color and "black 1" indicates that the subpath is black and 1 mm thick. Other information could also be stored for the path. For example, an indication of whether the path was recently inserted, erased (marked for deletion), or invariant (did not change) could be stored. An indication of whether the path is user drawn or is a gap line could be stored. Gap lines are more fully described in U.S. patent application Ser. No. 11/109,507 entitled GAP CLOSURE IN A DRAWING filed Apr. 19, 2005, which is incorporated herein by reference for all purposes. As shown, path 108 and path 110 are added to the drawing. Path 108 intersects path 106 at (a,b) and (c,d). Path 110 intersects path 106 at (g,h). Path 110 intersects path 108 at (i,j).

Figure 2B:
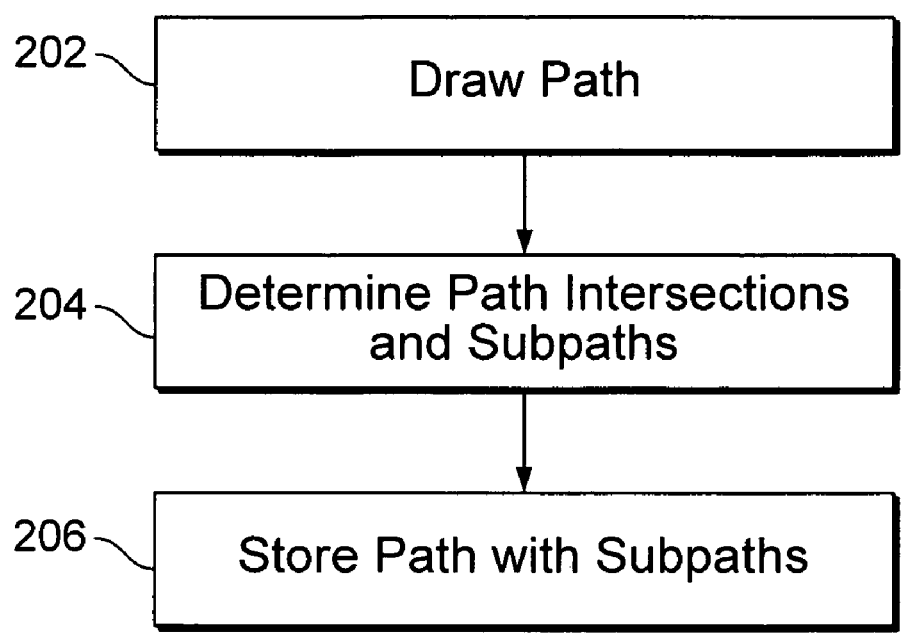
FIG. 2B illustrates an embodiment of a process for adding a path.

FIG. 2B illustrates an embodiment of a process for adding a path. For example, this process may be implemented when adding path 108 or path 110 to drawing 100, as shown in FIG. 2A. In the example shown, a path is drawn (202). For example, path 108 or path 110 is drawn. The path may be drawn using a path editing tool in a drawing application. The path intersections and subpaths are determined (204). A subpath, or edge, is a portion of a path between an intersection or endpoint and another intersection or endpoint of the path. For example, in drawing 201, the intersections of path 106 are (a,b), (g,h), and (c,d). Path 108 intersects with path 106 at (a,b) and (c,d). Path 110 intersects with path 106 at (g,h). The intersections of path 106 define the subpaths of path 106. The subpaths of path 106 are (a,b)->(g,h) and (g,h)->(c,d). Similarly, the intersections of path 108 are (a,b), (i,j), and (c,d). The subpaths of path 108 are (a,b)->(i,j) and (i,j)->(c,d). A path with no intersections has one subpath. Various algorithms may be used to determine the path intersections. For example, the Bentley-Ottman segment intersection algorithm is used in some embodiments.

The path is associated with its subpaths (206). For example, the path could be stored with its subpaths. Each subpath could include a sequence of color transitions and the color of the subpath. For example, the sequence of color transitions could include the color of the region on one side of the subpath and the color of the region on the other side of the subpath. The colors on the two sides of the subpath are the subpath region colors. In some embodiments, the path and subpaths are stored in an artwork representation. The following is an example of an artwork representation of drawing 201:

path 106
 (a,b)->(E,F)->(G,H)->(c,d)
 (a,b)->(g,h) none none black 1
 (g,h)->(c,d) none none black 1
 path 108
 <description of the geometric shape of path 108>
 (a,b)->(i,j) none none black 1
 (I,j)->(c,d) none none black 1
 path 110
 <description of the geometric shape of path 110>
 (e,f)->(g,h) none none black 1
 (g,h)->(i,j) none none black 1
 (i,j)->(k,l) none none black 1

In this example, "<description of the geometric shape of path 108>" refers to the sequence of cubic Bezier curve control points of path 108. (For purposes of explanation, the Bezier points are only shown for path 106.)

Figure 3:
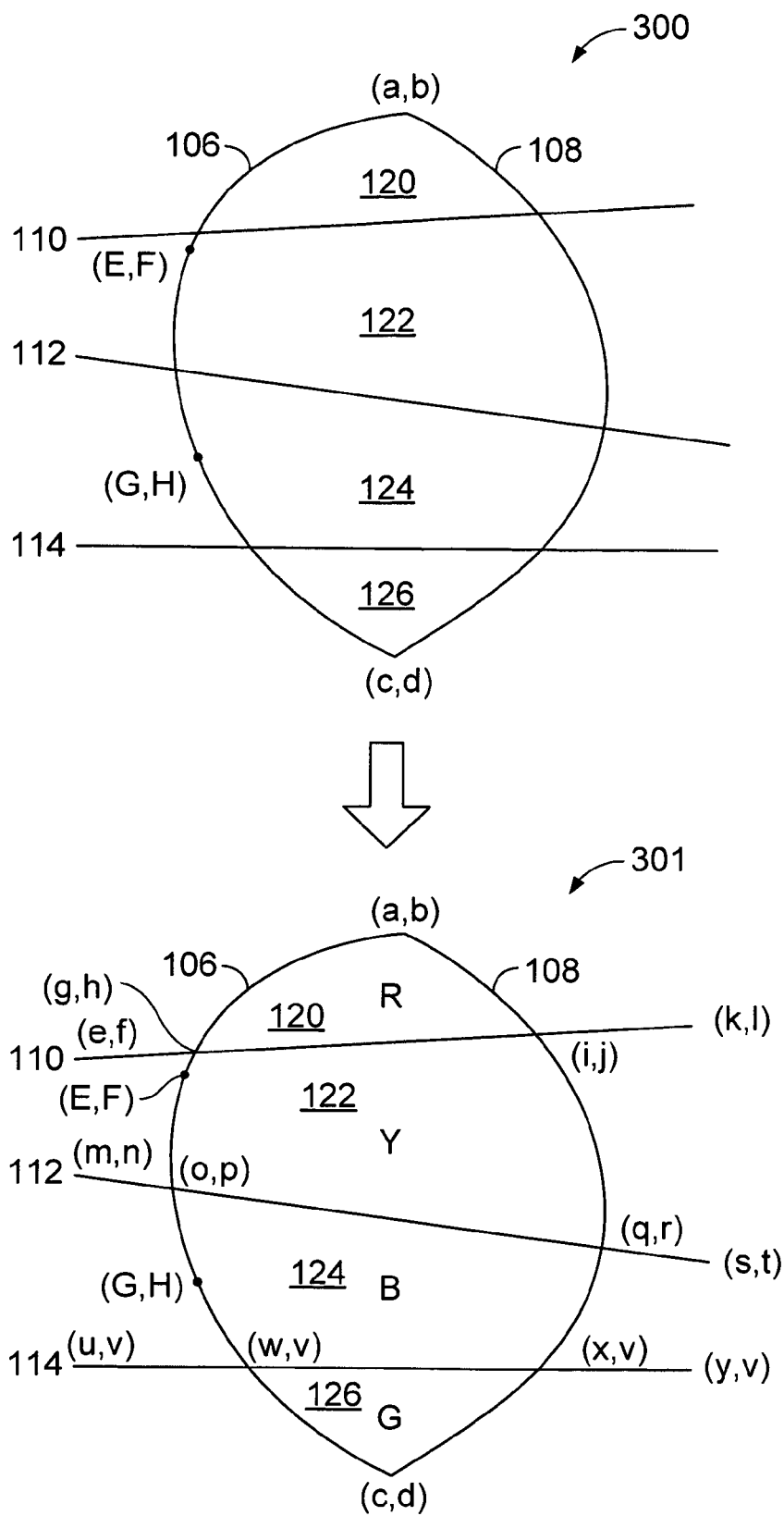
FIG. 3 illustrates a drawing before and after color has been added.

FIG. 3 illustrates a drawing before and after color has been added. In this example, drawing 300 is shown to include five paths 106, 108, 110, 112, and 114 and four regions 120, 122, 124, and 126. Paths 106 and 108 intersect at points (a,b) and (c,d). Paths 106 and 108 are intersected by paths 110, 112, and 114 to form regions 120, 122, 124, and 126. In some embodiments, the path definition is stored for each path, e.g., in an artwork representation. The following is an example of an artwork representation of drawing 300:

path 106
 (a,b)->(E,F)->(G,H)->(c,d)
 (a,b)->(g,h) none none black 1
 (g,h)->(o,p) none none black 1
 (o,p)->(w,x) none none black 1
 (w,x)->(c,d) none none black 1
 path 108
 <description of the geometric shape of path 108>
 (a,b)->(i,j) none none black 1
 (i,j)->(q,r) none none black 1
 (q,r)->(x,v) none none black 1
 (x,v)->(c,d) none none black 1
 path 110
 <description of the geometric shape of path 110>
 (e,f)->(g,h) none none black 1
 (g,h)->(i,j) none none black 1
 (i,j)->(k,l) none none black 1
 path 112
 <description of the geometric shape of path 112>
 (m,n)->(o,p) none none black 1
 (o,p)->(q,r) none none black 1
 (q,r)->(s,t) none none black 1
 path 114
 <description of the geometric shape of path 114>
 (u,v)->(w,v) none none black 1
 (w,v)->(x,v) none none black 1
 (x,v)->(y,v) none none black 1

In drawing 301, each region is filled with a color. For example, in some applications, a paint bucket tool could be used to fill each region with a color. In this example, region 120 is red, region 122 is yellow, region 124 is blue, and region 126 is green. The following is an example of an artwork representation of drawing 301:

path 106
 (a,b)->(E,F)->(G,H)->(c,d)
 (a,b)->(g,h) none red black 1
 (g,h)->(o,p) none yellow black 1
 (o,p)->(w,x) none blue black 1
 (w,x)->(c,d) none green black 1
 path 108
 <description of the geometric shape of path 108>
 (a,b)->(i,j) none red black 1
 (i,j)->(q,r) none yellow black 1
 (q,r)->(x,v) none blue black 1
 (x,v)->(c,d) none green black 1
 path 110
 <description of the geometric shape of path 110>
 (e,f)->(g,h) none none black 1
 (g,h)->(i,j) red yellow black 1
 (i,j)->(k,l) none none black 1
 path 112
 <description of the geometric shape of path 112>
 (m,n)->(o,p) none none black 1
 (o,p)->(q,r) yellow blue black 1
 (q,r)->(s,t) none none black 1
 path 114
 <description of the geometric shape of path 114>
 (u,v)->(w,v) none none black 1
 (w,v)->(x,v) blue green black 1
 (x,v)->(y,v) none none black 1

In this example, each path is listed, followed by a description of the path and a list of subpaths and subpath definitions. For example, for path 114, "(w,v)->(x,v) blue green black 1" is a subpath definition. "(w,v)->(x,v)" indicates that a subpath is defined on path 114 between (w,v) and (x,v). The color transition "blue green" indicates that the region on one side of the subpath is blue and the region on the other side of the subpath is green. "black 1" indicates that the subpath is black and 1 mm thick. The path definitions, subpath definitions, color transitions, and other information can be stored in any form in other embodiments.

Figure 4A:
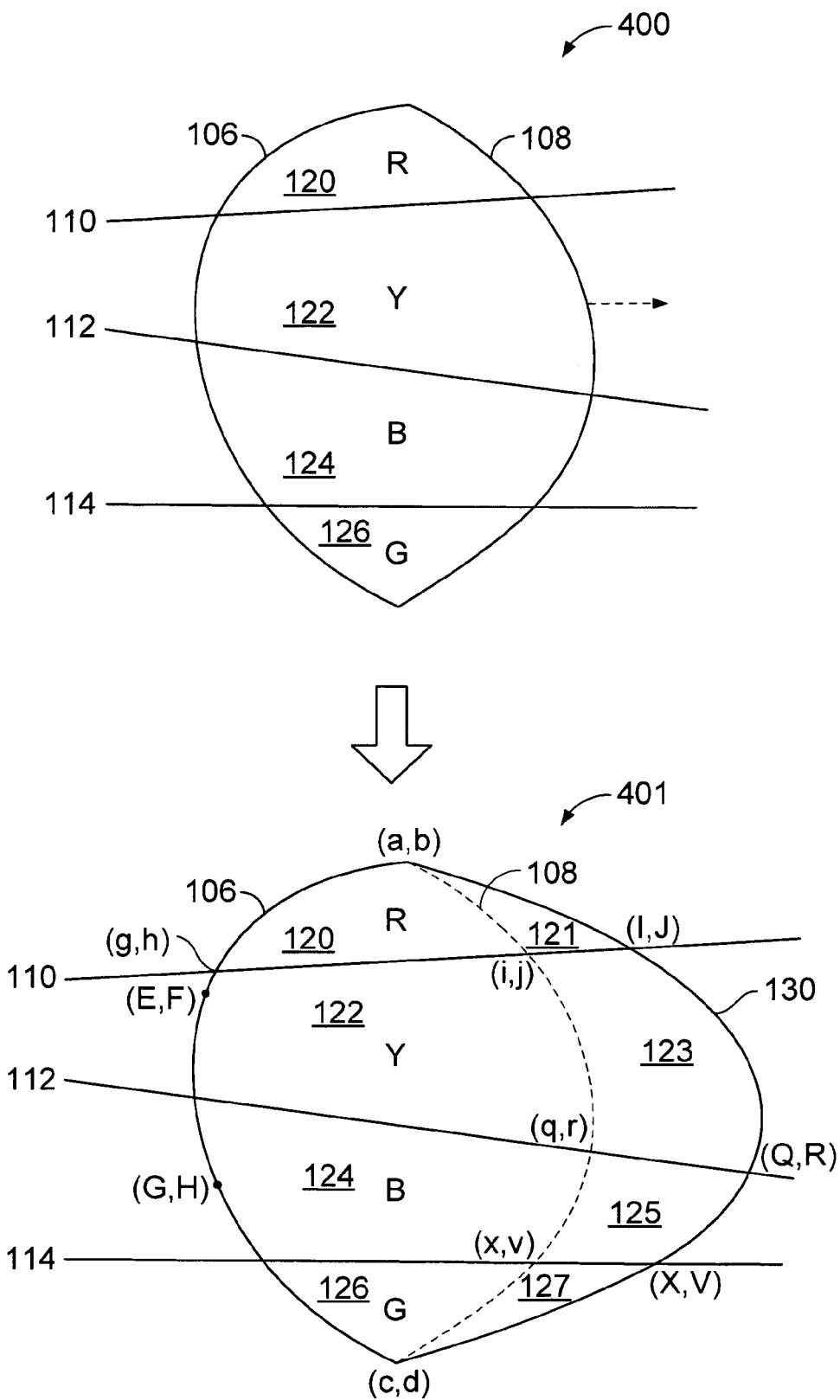
FIG. 4A illustrates a drawing before and after an edit.

FIG. 4A illustrates a drawing before and after an edit. In this example, drawing 400 is shown to include five paths 106, 108, 110, 112, and 114 and four regions 120, 122, 124, and 126. Paths 106 and 108 intersect each other at points (a,b) and (c,d). Paths 106 and 108 are intersected by paths 110, 112, and 114 to form regions 120, 122, 124, and 126. Each region is filled by a color. For example, in some applications, a paint bucket tool can be used to fill each region with a color. In this example, region 120 is red, region 122 is yellow, region 124 is blue, and region 126 is green.

An original defining path can be edited. For example, a user may wish to stretch path 108 to make path 108 wider. The user could use a mouse to click on path 108 and drag it to the right, as shown by the dashed arrow. As shown, after this edit, path 108 is stretched (becoming path 130) and path 108 is wider.

Figure 4B:
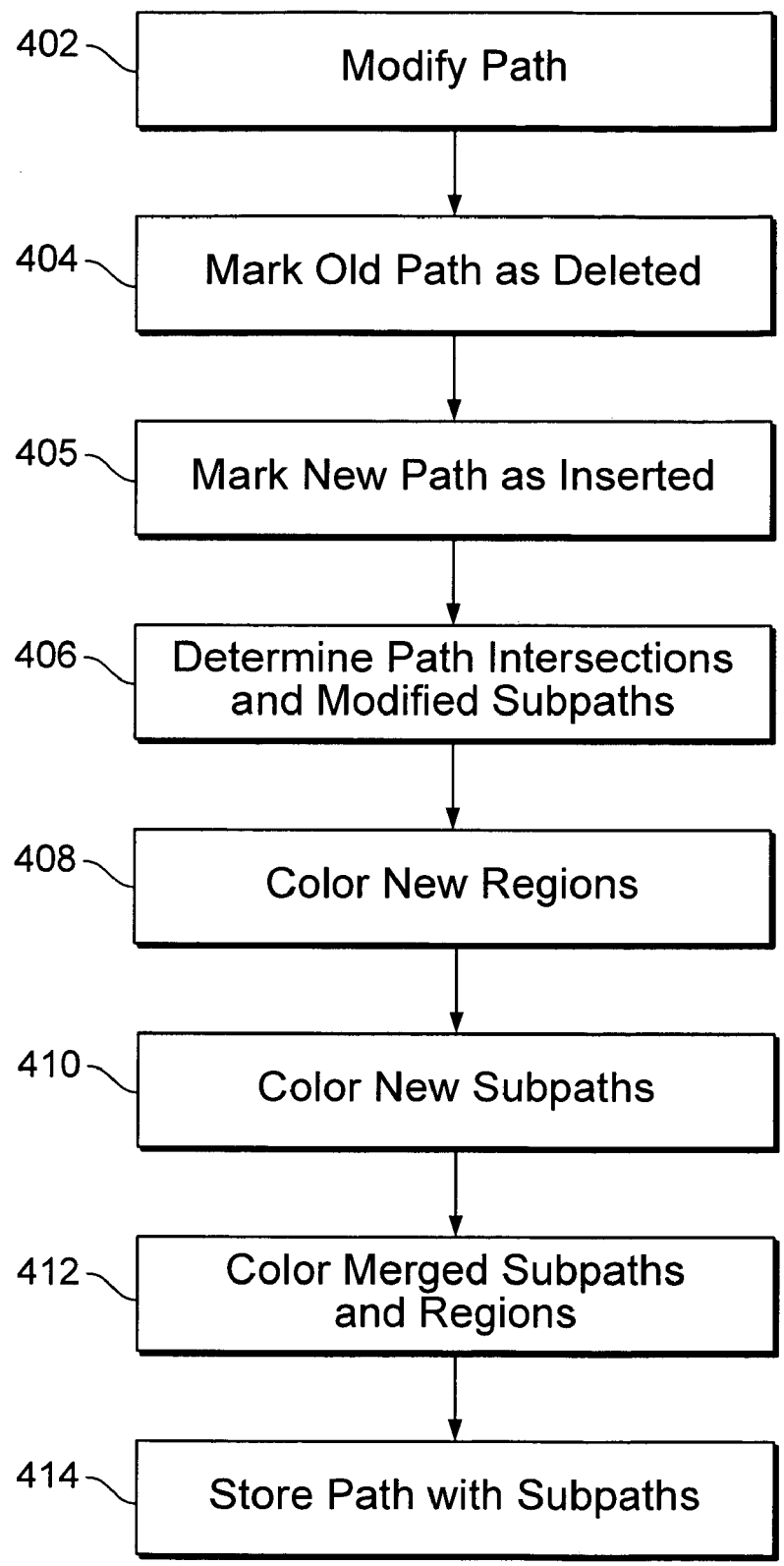
FIG. 4B illustrates an embodiment of a process for modifying a path.

FIG. 4B illustrates an embodiment of a process for modifying a path. For example, this process may be implemented when stretching path 108 as shown in FIG. 4A. In the example shown, a path is modified (402). For example, the path may be modified by dragging or stretching the path using an editing tool. For example, in FIG. 4A, path 108 is selected and dragged. The old path is marked as deleted (404). For example, in FIG. 4A, path 108 is marked as deleted. The new path is marked as inserted (405). For example, in FIG. 4A, path 130 is marked as inserted. In some embodiments, the unchanged paths in the drawing are marked as invariant. Optionally, gaps are detected and closed, as more fully described in GAP DETECTION IN A DRAWING, which was previously incorporated by reference.

Path intersections and modified subpaths are determined (406). For example, in drawing 401, path 130 has five intersections: (a,b), (I,J), (Q,R), (X,V), and (c,d). Path 130 intersects path 106 at (a,b) and (c,d). Path 130 intersects path 110, path 112, and path 114, at (I,J), (Q,R), and (X,V), respectively. Path 130 has four subpaths ((a,b)->(I,J), (I,J)->(Q,R), (Q,R)->(X,V), and (X,V)->(c,d)). Similarly, paths 110, 112, and 114 each have three intersections and four subpaths.

New regions are colored (408). For example, in drawing 401, new regions 121, 123, 125, and 127 are colored. In some embodiments, the new regions are colored according to a set of color assignment rules. For example, the rules could state that the color of the new region remains the same as it was before the new region was created, in which case, new regions 121, 123, 125, and 127 would have no color.

New subpaths are colored (410). For example, in drawing 401, new subpaths (a,b)->(I,J), (I,J)->(Q,R), (Q,R)->(X,V), and (X,V)->(c,d) are colored. In some embodiments, the subpaths are colored according to a set of color assignment rules. For example, the color assignment rules could state that when moving a path, the subpath colors remain the same, in which case the subpaths of path 130 would have the same colors as the corresponding subpaths of path 108. Subpath (a,b)->(I,J) has the same color and width as subpath (a,b)->(i,j), etc.

Paths marked as deleted are then deleted, which may result in merged regions and subpaths. Merged regions and subpaths are colored (412). For example, in FIG. 4A, path 108 is marked deleted. When path 108 is deleted, regions 120 and 121 merge, regions 122 and 123 merge, regions 124 and 125 merge, and regions 126 and 127 merge. These merged regions are colored.

In some embodiments, the merged regions are colored according to a set of color assignment rules. In some embodiments, the color assignment rules state that when merging two or more original regions, the merged region is assigned the color of the original region with the greatest area. For example, the color of merged region 120-121 could be assigned by comparing the area of region 120 with the area of region 121. If the area of region 120 is greater, then merged region 120-121 is assigned the color of region 120 (in this case, red). If the area of region 121 is greater, then merged region 120-121 is assigned the color of region 121 (in this case, no color). In the latter example, a color assignment rule resulting in no color for region 121 may not have been the result intended by the user. As such, in some embodiments, a color reassignment process is performed in order to reassign colors based on certain criteria.

Similarly, merged subpaths are colored. For example, when path 108 is deleted, subpath (g,h)->(i,j) is merged with subpath (i,j)->(I,J) into merged subpath (g,h)->(I,J). The color and width of merged subpath (g,h)->(I,J) could be assigned by comparing the length of subpath (g,h)->(i,j) with the length of subpath (i,j)->(I,J). If the length of subpath (g,h)->(i,j) is greater, then merged subpath (g,h)->(I,J) is assigned the color and width of subpath (g,h)->(i,j). If the length of subpath (i,j)->(I,J) is greater, then merged subpath (g,h)->(I,J) is assigned the color and width of subpath (i,j)->(I,J). As with coloring merged regions, a color reassignment process is performed in some embodiments.

The path is associated with the subpaths (414). For example, the path and subpaths could be stored in a database or a file. The path and subpaths could be stored in an artwork representation. The following is an example of an artwork representation of drawing 401:

path 106
(a,b)->(E,F)->(G,H)->(c,d)
(a,b)->(g,h) none red black 1
(g,h)->(o,p) none yellow black 1
(o,p)->(w,x) none blue black 1
(w,x)->(c,d) none green black 1
path 130
<description of the geometric shape of path 130>
(a,b)->(I,J) none red black 1
(I,J)->(Q,R) none yellow black 1
(Q,R)->(X,V) none blue black 1
(X,V)->(c,d) none green black 1
path 110
description of the geometric shape of path 110>
(e,f)->(g,h) none none black 1
(g,h)->(I,J) red yellow black 1
(I,J)->(k,l) none none black 1
path 112
<description of the geometric shape of path 112>
(m,n)->(o,p) none none black 1
(o,p)->(Q,R) yellow blue black 1
(Q,R)->(s,t) none none black 1
path 114
<description of the geometric shape of path 114>
(u,v)->(w,v) none none black 1
(w,v)->(X,V) blue green black 1
(X,V)->(y,v) none none black 1

In this example, a move includes inserting a new path, marking an original path as deleted, and then deleting the original path. The move does not necessarily need to be decomposed into an insert and a delete. In other embodiments, the move can be implemented in other ways.

Figure 5:
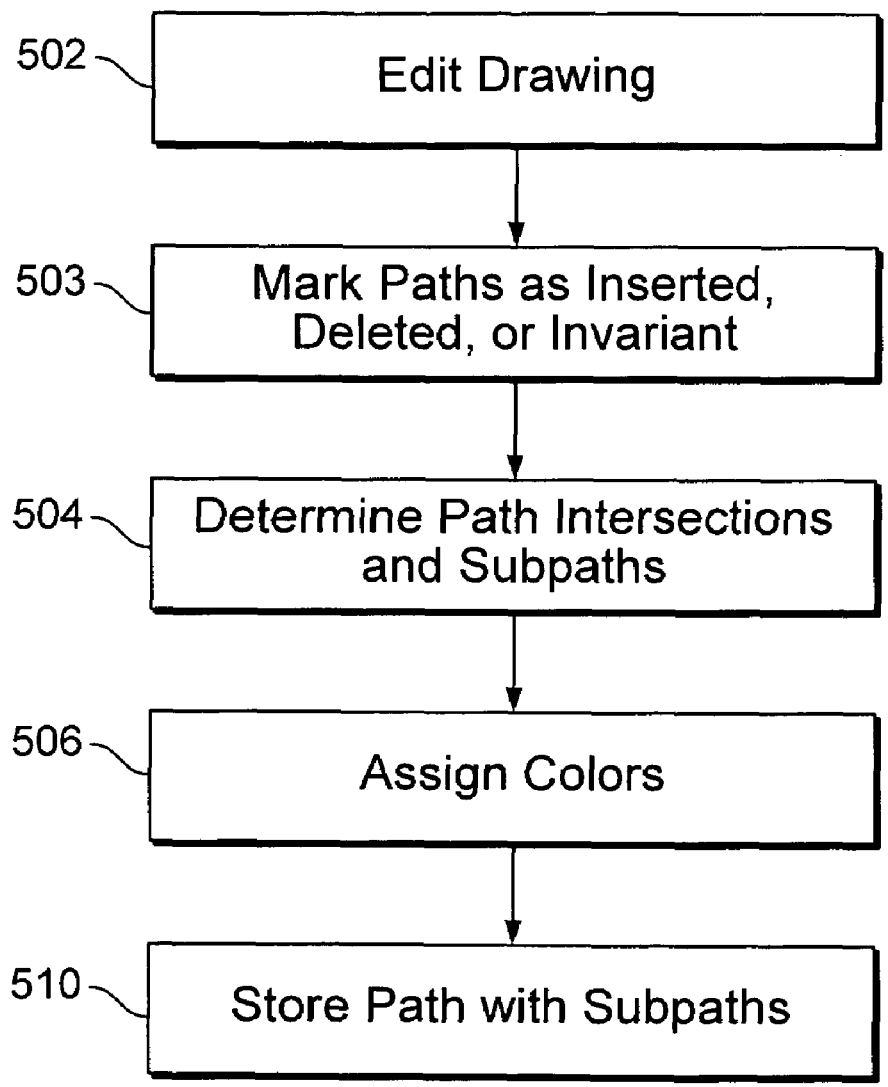
FIG. 5 illustrates an embodiment of a process for editing a path.

FIG. 5 illustrates an embodiment of a process for editing a path. In this example, the drawing is edited (502). Editing includes inserting, deleting, moving, rotating, coloring or modifying one or more paths, subpaths, or intersections in a drawing. An editing tool could be used to edit the drawing. For example, a mouse could be used to select a path, and then drag or rotate the path. The edit could include a single action edit. A single action edit, as used herein, refers to a single edit to a path. For example, a single edit to a path includes dragging, rotating, or moving the path in a single action. Paths are marked as inserted, deleted, or invariant (503), as previously described.

Path intersections and subpaths are determined (504). The intersections and subpaths could be determined in various ways. For example, the Bentley-Ottman segment intersection algorithm could be used. In some embodiments, only the portion of the drawing affected by the edit is searched rather than the whole drawing. In some embodiments, snap rounding, in which intersections and/or endpoints are "snapped" to a snap rounding point, is used. For example, the Hobby snap rounding algorithm could be used.

In some embodiments, the intersections and subpaths are stored in an internal data structure, such as an arrangement graph. The internal data structure is arranged in a form that allows data to be accessed more efficiently when performing color assignment in (506). For example, the internal data structure could include a node for each intersection and indicate which paths intersect with the node. In some embodiments, the internal data structure includes a description of the regions, edges, and vertices formed by the paths in the drawing. In some embodiments, the internal data structure includes edges, half edges, vertices, boundaries, faces, branches, compound faces, and compound branches, or as described in "Incremental Computation of Planar Maps" by M. Gangnet, J. Herve, T. Pudet, and J. Van Thong (Computer Graphics, Volume 23, Number 3, July 1989, pages 345-354). Compound faces refer to regions that span a path that is to be deleted.

Colors are assigned (506). In various embodiments, the colors are assigned by various methods. For example, the color could be assigned based on color assignment rules. The color assignment rules could specify that when there is a new region, the new region is assigned the color of the region before the new region was created. The rules might specify that when merging two or more original regions into a merged region, the merged region is assigned the color of the original region with greatest area. The color assignment rules could include similar rules for paths or subpaths. For example, when merging two or more original subpaths into a merged path or subpath, the merged path is assigned the color of the original subpath with greatest length. Colors could be assigned according to the similarity measure of Guha (S. Guha, R. Rastogi, K. Shim, "ROCK: A Robust Clustering Algorithm for Categorical Attributes", Information Systems, Volume 25, Number 5, 2000, pages 345-366.). In some embodiments, the colors are assigned by first deriving a color and stacking order for each path defining a region before the edit. After the edit, colors are assigned to modified regions by matching modified regions with their original regions based on geometry. Each modified region is assigned the color and relative stacking order of the original region that matches the modified region, as more fully described in U.S. patent application Ser. No. 11/109,490 entitled ASSIGNING REGION ATTRIBUTES IN A DRAWING filed Apr. 19, 2005, which is incorporated herein by reference for all purposes. The subpath colors could be assigned by first assigning a color to the subpath. After the edit, colors are assigned to the modified subpath based on geometry, as more fully described in U.S. patent application Ser. No. 11/109,837 entitled ASSIGNING SUBPATH ATTRIBUTES IN A DRAWING filed Apr. 19, 2005, which is incorporated herein by reference for all purposes. In some embodiments, colors are assigned to the subpaths and regions arbitrarily.

The path is associated with the subpaths (510). For example, the path and subpaths could be stored in a database or a file. The path and subpaths could be stored in an artwork representation. In some embodiments, the artwork representation is generated from an internal data structure. In some embodiments, the internal data structure is no longer needed and deleted.

Figure 6A:
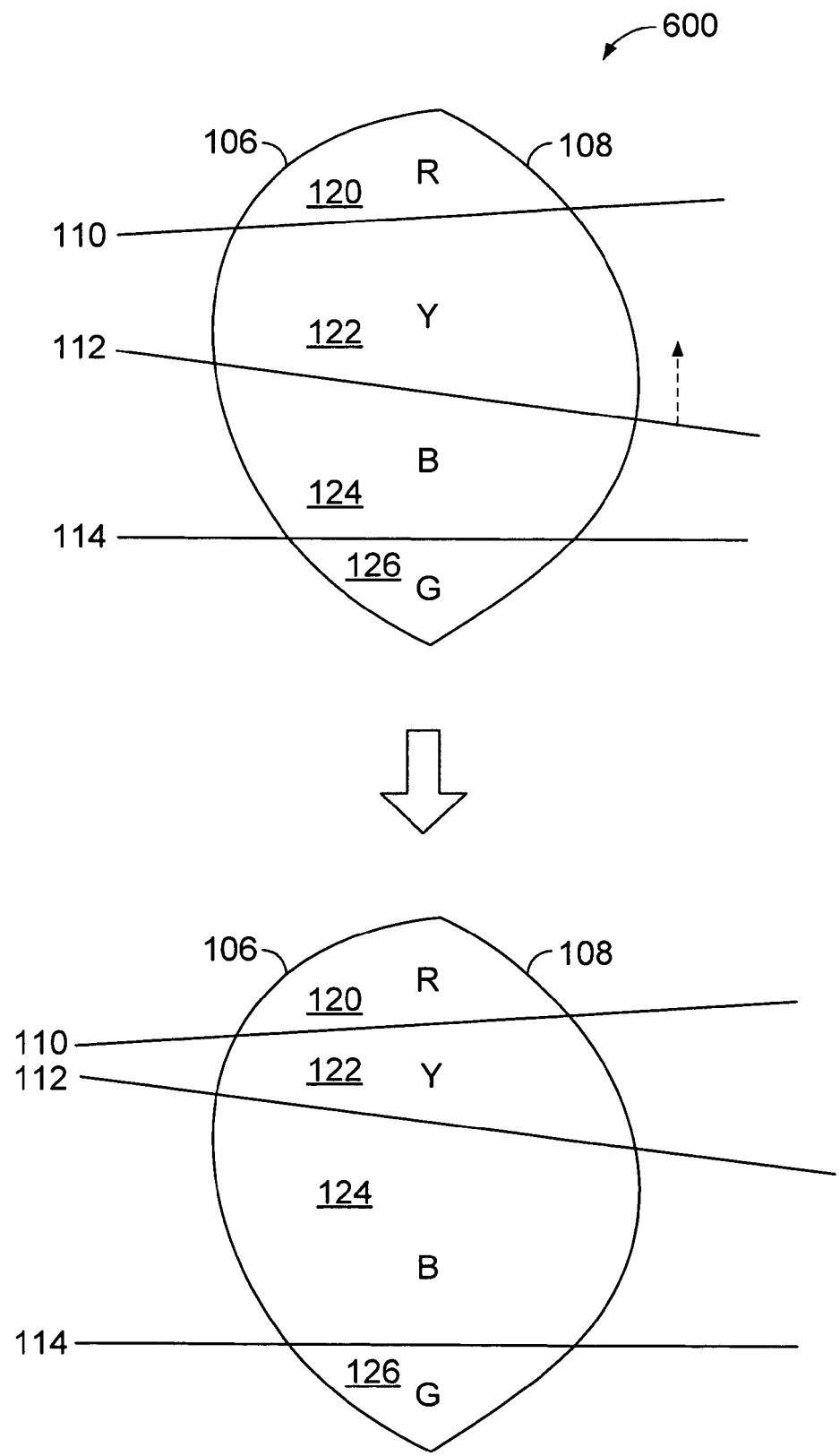
FIG. 6A illustrates an example of a drawing before and after a path is moved.

FIG. 6A illustrates an example of a drawing before and after a path is moved. In this example, drawing 600 is shown before and after path 112 is shifted upwards. For example, a user could use a mouse to select path 112 and drag it upwards. The entire defining path 112 is shifted, and the intersections and subpaths of paths 106, 108, and 112 are modified. In this example, the colors of the modified regions remain the same. Modified region 122 is yellow and modified region 124 is blue.

Figure 6B:
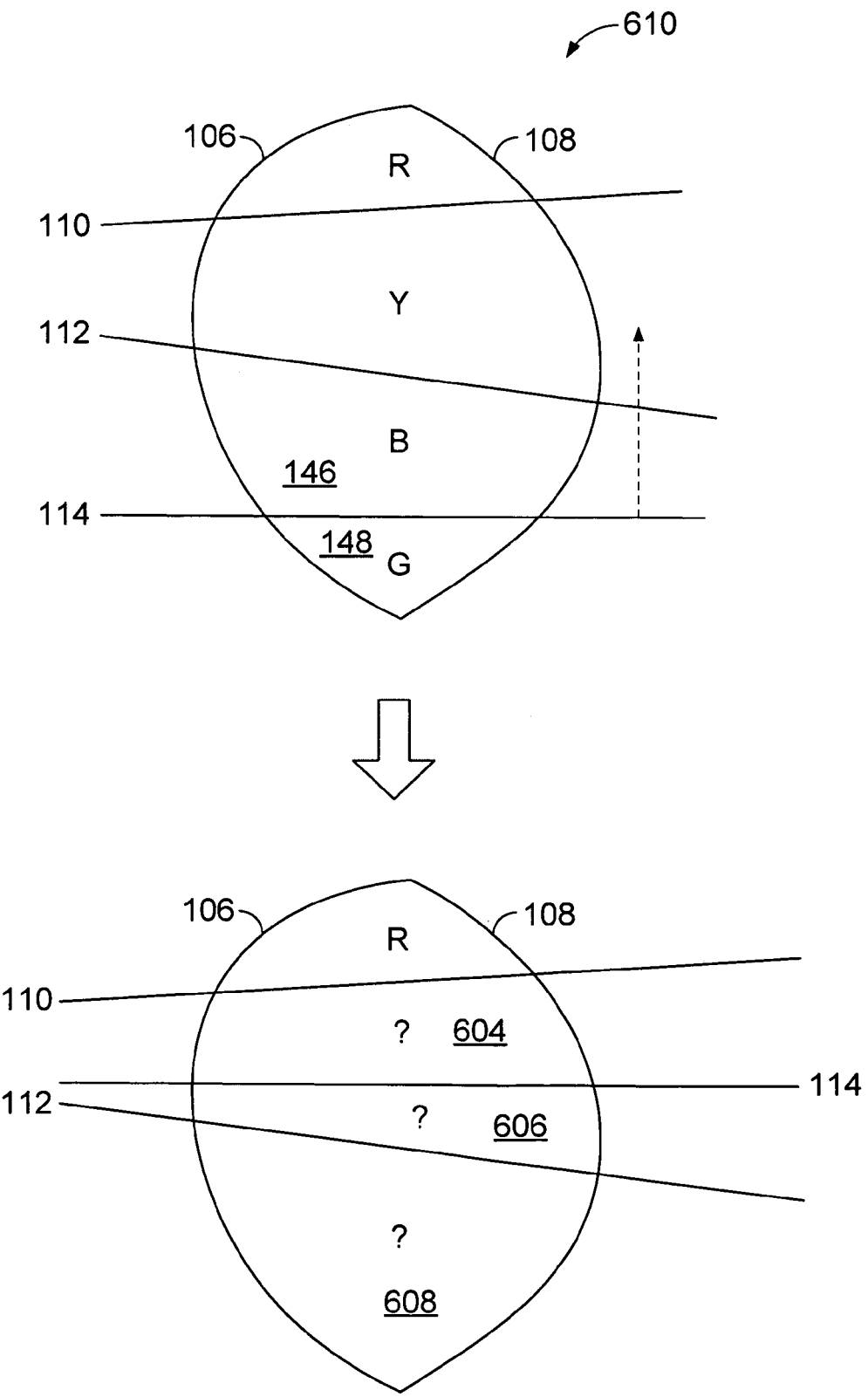
FIG. 6B illustrates an example of a drawing before and after a path is moved over another path.

FIG. 6B illustrates an example of a drawing before and after a path is moved over another path. In this example, drawing 610 is shown before and after path 114 is dragged up and over path 112. The entire defining path 114 can be dragged, causing the intersections and subpaths of paths 106, 108, and 114 to be modified. In some embodiments, the move is implemented by marking path 114 as deleted and creating a new path at the new location of path 114. Regions 146 and 148 become merged region 608. Regions 604 and 606 remain yellow. Merged region 608 is assigned the color blue because the area of region 146 is greater than the area of region 148.

In some embodiments, the colors are assigned according to other methods. For example, regions 606 and 608 could be assigned the color green based on a rule that colors cannot jump across lines. In this case, the colors yellow and blue cannot be below line 114. The color blue is "killed" because path 114 was dragged up and over blue region 606, coloring everything below it green. Any color reassignment rules can be specified in various embodiments. In addition, color reassignment rules could potentially reassign the colors of these regions.

Figure 6C:
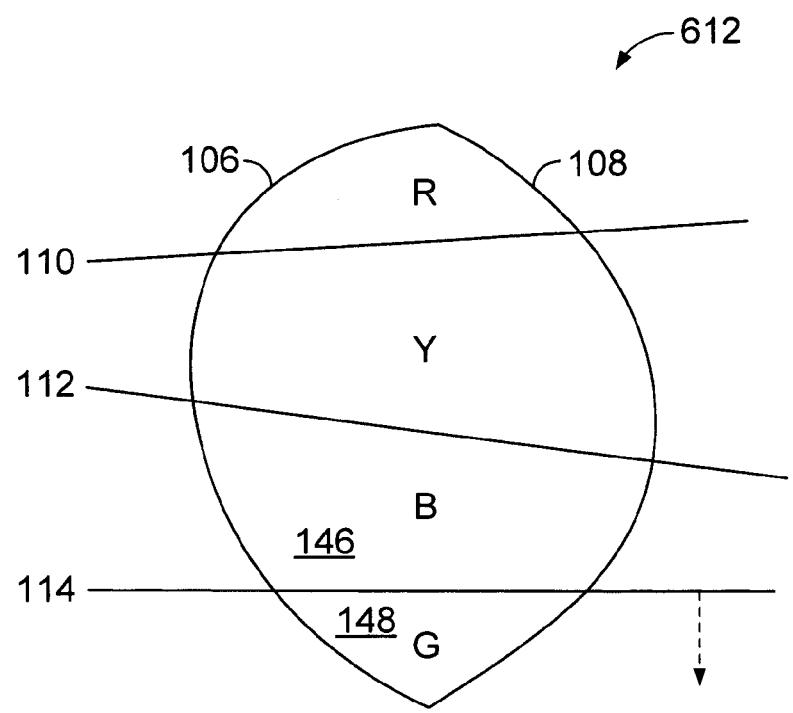
FIG. 6C illustrates an example of a drawing before and after a path is moved off of a region.
Figure 6C:
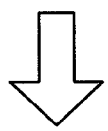
Figure 6C:
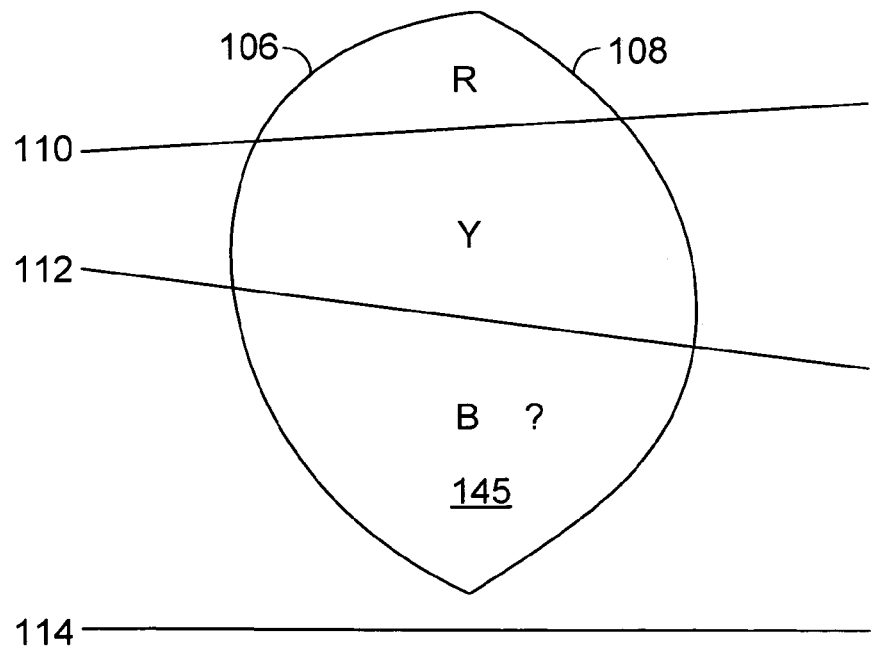

FIG. 6C illustrates an example of a drawing before and after a path is moved off of a region. In this example, drawing 612 is shown before and after path 114 is shifted downwards, so that it no longer intersects with paths 106 and 108. For example, a mouse can be used to select path 114 and drag it downwards. The entire defining path 114 can be dragged. Paths 106 and 108 each lose one intersection and one subpath. Path 114 loses two intersections and two subpaths, so that path 114 has one subpath (the path itself). Region 145 is assigned the color blue because the area of region 146 is greater than the area of region 148.

Figure 7:
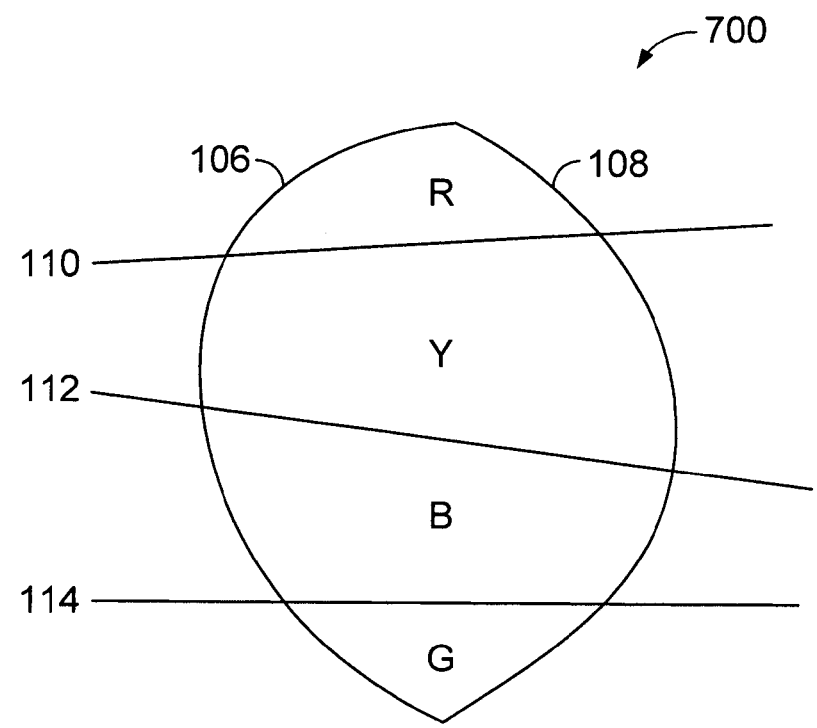
FIG. 7 illustrates an example of a drawing before and after a new path is added.
Figure 7:
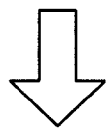
Figure 7:
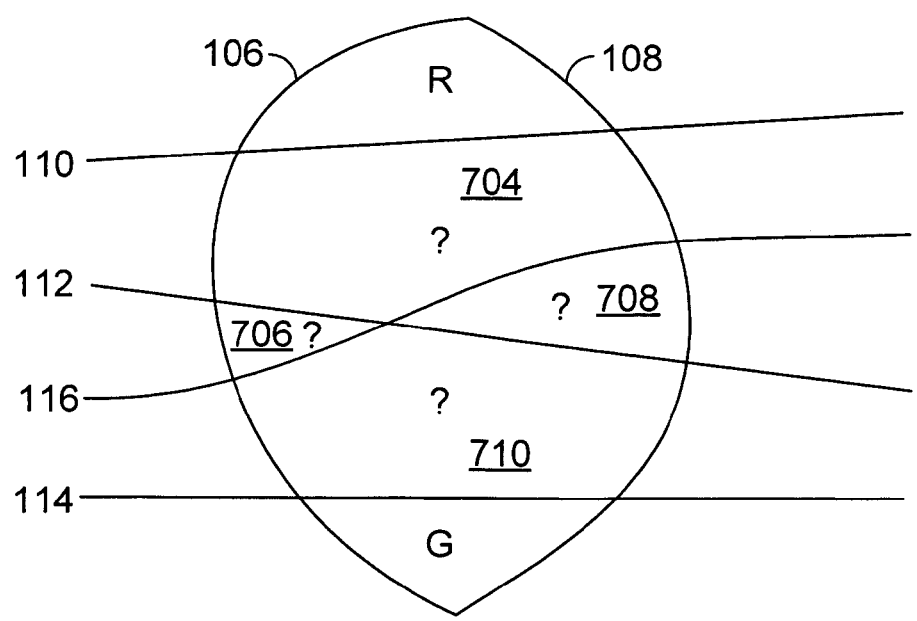

FIG. 7 illustrates an example of a drawing before and after a new path is added. In this example, drawing 700 is shown before and after path 116 is inserted. Paths 106, 108, and 112 each gain one intersection and one subpath. In this example, regions 704 and 708 are assigned the color yellow and regions 706 and 710 are assigned the color blue.

Figure 8:
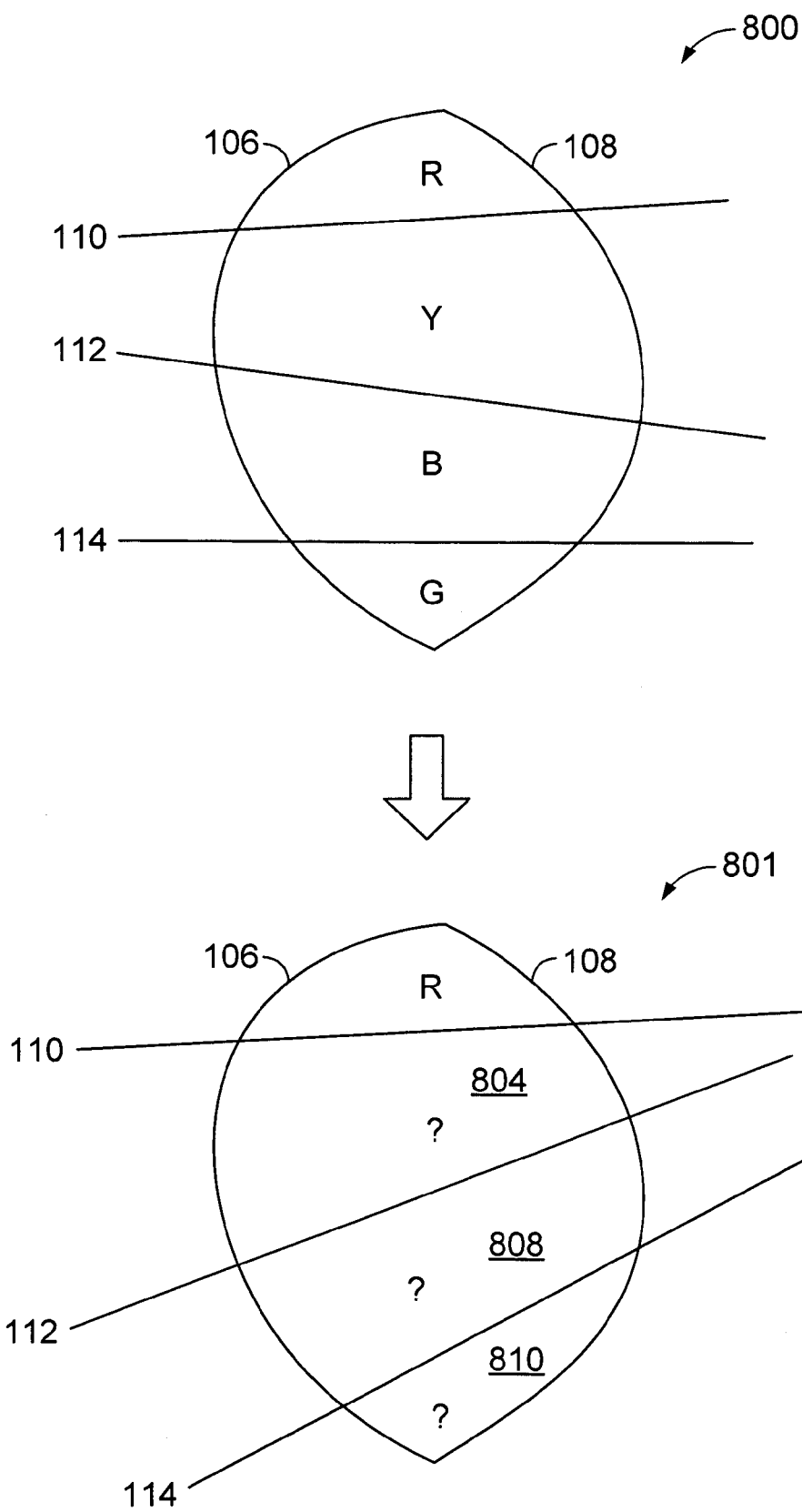
FIG. 8 illustrates an example of a drawing before and after two paths are selected and rotated.

FIG. 8 illustrates an example of a drawing before and after two paths are selected and rotated. In this example, drawing 800 is shown before and after paths 112 and 114 are selected and rotated. The intersections and subpaths of paths 106, 108, 112, and 114 are modified. In this example, region 804 is assigned the color yellow, region 808 is assigned the color blue, and region 810 is assigned the color green.

Figure 9:
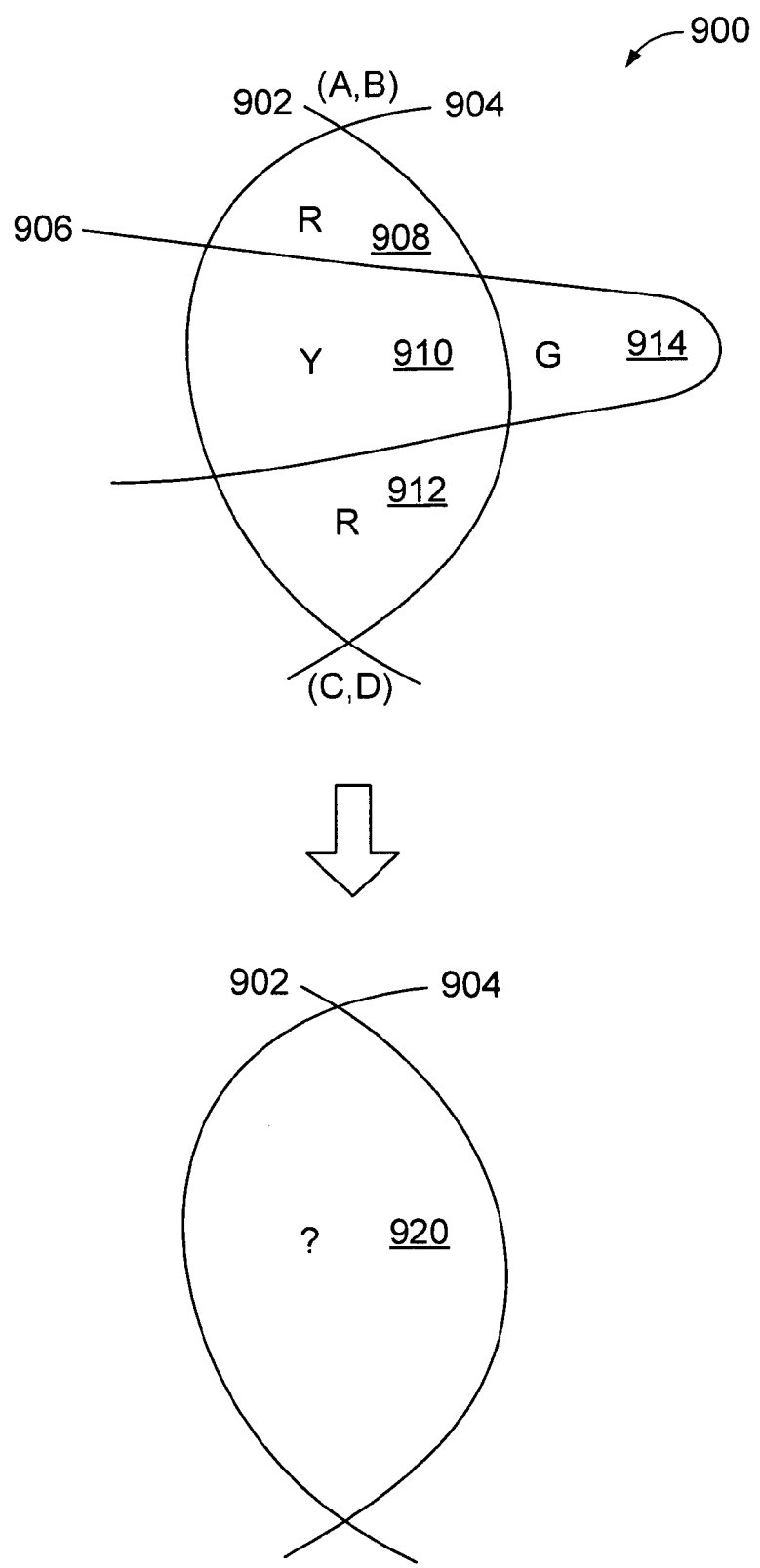
FIG. 9 illustrates an example of a drawing before and after a path is deleted.

FIG. 9 illustrates an example of a drawing before and after a path is deleted. In this example, drawing 900 is shown to include three paths 902, 904, and 906 and four regions 908, 910, 912, and 914. Paths 902 and 904 intersect each other at points (A,B) and (C,D). Paths 902 and 904 are intersected by path 906 to form regions 908, 910, 912, and 914. Each region is filled with a color. For example, a paint bucket tool could be used to fill each region with a color. In this example, region 908 is red, region 910 is yellow, region 912 is red, and region 914 is green.

Drawing 900 is shown before and after path 906 is deleted. Paths 902 and 904 each lose two intersections and two subpaths. Regions 908, 910, and 912 merge into region 920. Region 920 is assigned the color red because regions 908 and 912 are red and have a greater total area than region 910.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of editing, including:
generating a path definition for a path having a plurality of intersections with a plurality of other paths;
identifying a plurality of subpaths of the path, each subpath comprising a portion of the path between a first intersection or endpoint of the path and a second intersection or endpoint of the path, the second intersection or endpoint being distinct from and adjacent to the first intersection or endpoint;
automatically generating a subpath definition for each subpath based on the one or more identified subpaths, each subpath definition including a subpath region fill for each side of the subpath, wherein automatically generating the subpath definition for each subpath is performed by a processor;
storing the subpath definitions in a memory;
associating the subpath definitions with the path definition;
modifying the path, wherein each subpath of the path is simultaneously modified along with the path;
automatically generating a modified path definition for a modified path having a plurality of modified subpaths corresponding to the path definition for the path having the plurality of subpaths;
detecting that the plurality of intersections of the path have been modified;
automatically generating a modified subpath definition for each modified subpath based on the plurality of modified intersections of the path in response to detecting that the plurality of intersections of the path have been modified, each modified subpath definition including a modified subpath region fill for each side of the modified subpath, wherein automatically generating a modified subpath definition includes, for each modified subpath region fill, automatically selecting as the modified subpath region fill one of the subpath region fills of the subpath corresponding to the modified subpath; and
displaying the path on a display.

2. A method as recited in claim 1, wherein detecting includes receiving an indication that the path definition has been modified.

3. A method as recited in claim 1, wherein detecting includes receiving an indication that another path has been modified.

4. A method as recited in claim 1, wherein detecting includes receiving an indication that a new path has been added.

5. A method as recited in claim 1, wherein detecting includes receiving an indication that another path has been deleted.

6. A method as recited in claim 1, wherein detecting includes receiving an indication that the path has been moved.

7. A method as recited in claim 1, wherein an intersection of the path is with itself.

8. A method as recited in claim 1, further including replacing the set of subpath definitions with the set of modified subpath definitions.

9. A method as recited in claim 1, wherein each subpath definition includes a subpath fill and each modified subpath definition includes a modified subpath fill.

10. A method as recited in claim 9, wherein automatically generating a plurality of modified subpath definitions of subpaths of the path includes, for each modified subpath fill, selecting one of the subpath fills as the modified subpath fill.

11. A method as recited in claim 10, wherein selecting one of the subpath fills as the modified subpath fill includes:
merging two subpaths into the modified subpath;
determining which of the two subpaths has a greater length; and
assigning to the modified subpath the subpath fill of the subpath that has the greater length.

12. A method as recited in claim 9, wherein the subpath fill includes color, pattern, or thickness of the subpath.

13. A method as recited in claim 1, wherein selecting one of the subpath region fills as the modified subpath region fill includes arbitrarily selecting one of the subpath region fills as the modified subpath region fill.

14. A method as recited in claim 1, wherein selecting one of the subpath region fills as the modified subpath region fill includes merging two subpath regions into the modified subpath region and selecting as the modified subpath region fill a subpath region fill of one of the two subpath regions.

15. A method as recited in claim 14, wherein selecting as the modified subpath region fill a subpath region fill of one of the two subpath regions includes:
determining which of the two subpath regions has a greater area; and
assigning to the modified subpath region the subpath region fill of the subpath region that has the greater area.

16. A method as recited in claim 1, further including reassigning at least one of the modified subpath region fills.

17. A method as recited in claim 1, further including associating the modified subpath definitions with the path definition.

18. A method as recited in claim 1, further including marking the path definition as deleted.

19. A method as recited in claim 1, further including inserting a new path definition associated with a new path, wherein the subpaths of the new path each have a same subpath fill or subpath region fill as one or more existing regions.

20. A method as recited in claim 1, further including determining a modified intersection by analyzing a portion of the drawing affected by the modification.

21. A method as recited in claim 1, wherein associating includes storing.

22. A method as recited in claim 1, wherein detecting includes receiving an indication that the one or more intersections of the path have been modified using a single edit action to the path.

23. A method as recited in claim 22, wherein the single edit action includes shifting or dragging the entire path.

24. A method as recited in claim 22, wherein the single edit action includes stretching the entire path.

25. A method as recited in claim 1, wherein each subpath is not individually editable.

26. A method as recited in claim 1, wherein the subpath region fill includes a color or a pattern.

27. A method as recited in claim 1, wherein at least one of the modified subpaths is a subpath that was moved; and the at least one modified subpath has at least one modified subpath region fill that is the same as a subpath region fill of the subpath.

28. A system for editing, including:
a processor configured to:
generate a path definition for a path having a plurality of intersections with a plurality of other paths;
identifying a plurality of subpaths of the path, each subpath comprising a portion of the path between a first intersection or endpoint of the path and a second intersection or endpoint of the path, the second intersection or endpoint being distinct from and adjacent to the first intersection or endpoint;

automatically generate a subpath definition for each subpath based on the one or more identified subpaths, each subpath definition including a subpath region fill for each side of the subpath, wherein automatically generating the subpath definition for each subpath is performed by a processor;

store the subpath definitions in a memory;

associate the subpath definitions with the path definition;

modify the path, wherein each subpath of the path is simultaneously modified along with the path;

automatically generate a modified path definition for a modified path having a plurality of modified subpaths corresponding to the path definition for the path having the plurality of subpaths;

detect that the plurality of intersections of the path have been modified;

automatically generate a modified subpath definition for each modified subpath based on the plurality of modified intersections of the path in response to detecting that the plurality of intersections of the path have been modified, each modified subpath definition including a modified subpath region fill for each side of the modified subpath, wherein automatically generating a modified subpath definition includes, for each modified subpath region fill, automatically selecting as the modified subpath region fill one of the subpath region fills of the subpath corresponding to the modified subpath; and display the path on a display;

a memory coupled with the processor, wherein the memory provides the processor with instructions.

29. A system as recited in claim 28, wherein each subpath definition includes a subpath fill and each modified subpath definition includes a modified subpath fill; and the processor is configured to automatically generate a plurality of modified subpath definitions of subpaths of the path at least in part by, for each modified subpath fill, selecting one of the subpath fills as the modified subpath fill.

30. A system as recited in claim 28, wherein the processor is further configured to associate the modified subpath definitions with the path definition.

31. A system as recited in claim 28, wherein the processor is configured to detect at least in part by receiving an indication that the one or more intersections of the path have been modified using a single edit action to the path.

32. A computer readable storage medium encoded with a computer program product for editing, the computer program product comprising computer instructions for:

generating a path definition for a path;

identifying one or more subpaths of the path, each subpath comprising a portion of the path between a first intersection or endpoint of the path and a second intersection or endpoint of the path, the second intersection or endpoint being distinct from and adjacent to the first intersection or endpoint;

generating a path definition for a path having a plurality of intersections with a plurality of other paths;

identifying a plurality of subpaths of the path, each subpath comprising a portion of the path between a first intersection or endpoint of the path and a second intersection or endpoint of the path, the second intersection or endpoint being distinct from and adjacent to the first intersection or endpoint;

automatically generating a subpath definition for each subpath based on the one or more identified subpaths, each subpath definition including a subpath region fill for each side of the subpath, wherein automatically generating the subpath definition for each subpath is performed by a processor;

storing the subpath definitions in a memory;

associating the subpath definitions with the path definition;

modifying the path, wherein each subpath of the path is simultaneously modified along with the path;

automatically generating a modified path definition for a modified path having a plurality of modified subpaths corresponding to the path definition for the path having the plurality of subpaths;

detecting that the plurality of intersections of the path have been modified;

automatically generating a modified subpath definition for each modified subpath based on the plurality of modified intersections of the path in response to detecting that the plurality of intersections of the path have been modified, each modified subpath definition including a modified subpath region fill for each side of the modified subpath, wherein automatically generating a modified subpath definition includes, for each modified subpath region fill, automatically selecting as the modified subpath region fill one of the subpath region fills of the subpath corresponding to the modified subpath; and displaying the path on a display.

33. A computer program product as recited in claim 32, wherein detecting includes receiving an indication that the one or more intersections of the path have been modified using a single edit action to the path.

* * * * *